United States Patent [19]
Peyre

[11] Patent Number: 4,886,566
[45] Date of Patent: Dec. 12, 1989

[54] MACHINE FOR FRANKING LABELS

[75] Inventor: Jacques Peyre, Paris, France

[73] Assignee: Societe anonyme dite: SMH Alcatel, Paris, France

[21] Appl. No.: 202,646

[22] Filed: Jun. 6, 1988

[30] Foreign Application Priority Data

Jun. 5, 1987 [FR] France ............................... 87 07912

[51] Int. Cl.[4] ............................................... B32B 31/00
[52] U.S. Cl. .................................... 156/361; 156/364; 156/384; 250/223 R; 250/571
[58] Field of Search ................................ 156/361-364, 156/384; 250/222.2, 223 R, 571; 200/61.02, 61.41

[56] References Cited

U.S. PATENT DOCUMENTS 4,157,670 6/1979 Herring .
4,328,402 5/1982 Call ................................. 200/61.41
4,547,249 10/1985 Dadzik et al. ........................ 156/363
4,614,867 9/1986 Lane ................................ 250/223 R

FOREIGN PATENT DOCUMENTS 554525 7/1957 Belgium .
0173328 3/1986 European Pat. Off. .
0202486 11/1986 European Pat. Off. .
2004230 8/1970 Fed. Rep. of Germany .
2033829 12/1970 France .

*Primary Examiner*—David A. Simmons
*Attorney, Agent, or Firm*—Sughrue, Mion, Zinn, Macpeak & Seas

[57] ABSTRACT

A machine for franking short labels or long labels cut from a continuous tape is characterized in that it includes a first pair of detector cells (20-21) for positioning the tape relative to a cutter (6) for obtaining a short length of label, and a second pair of detector cells (22-23) for positioning the tape relative to the cutter for obtaining a long length of label, and for presenting the label, be it short or long, beneath the print drum (3), said second pair of detector cells being mounted offset from the drum and from the tape path and being controlled by a shutter tab (42) which is fixed to a pivoting lever (25) having a tooth or feeler (39) which is retracted by the tape or a label arriving beneath the drum.

7 Claims, 1 Drawing Sheet

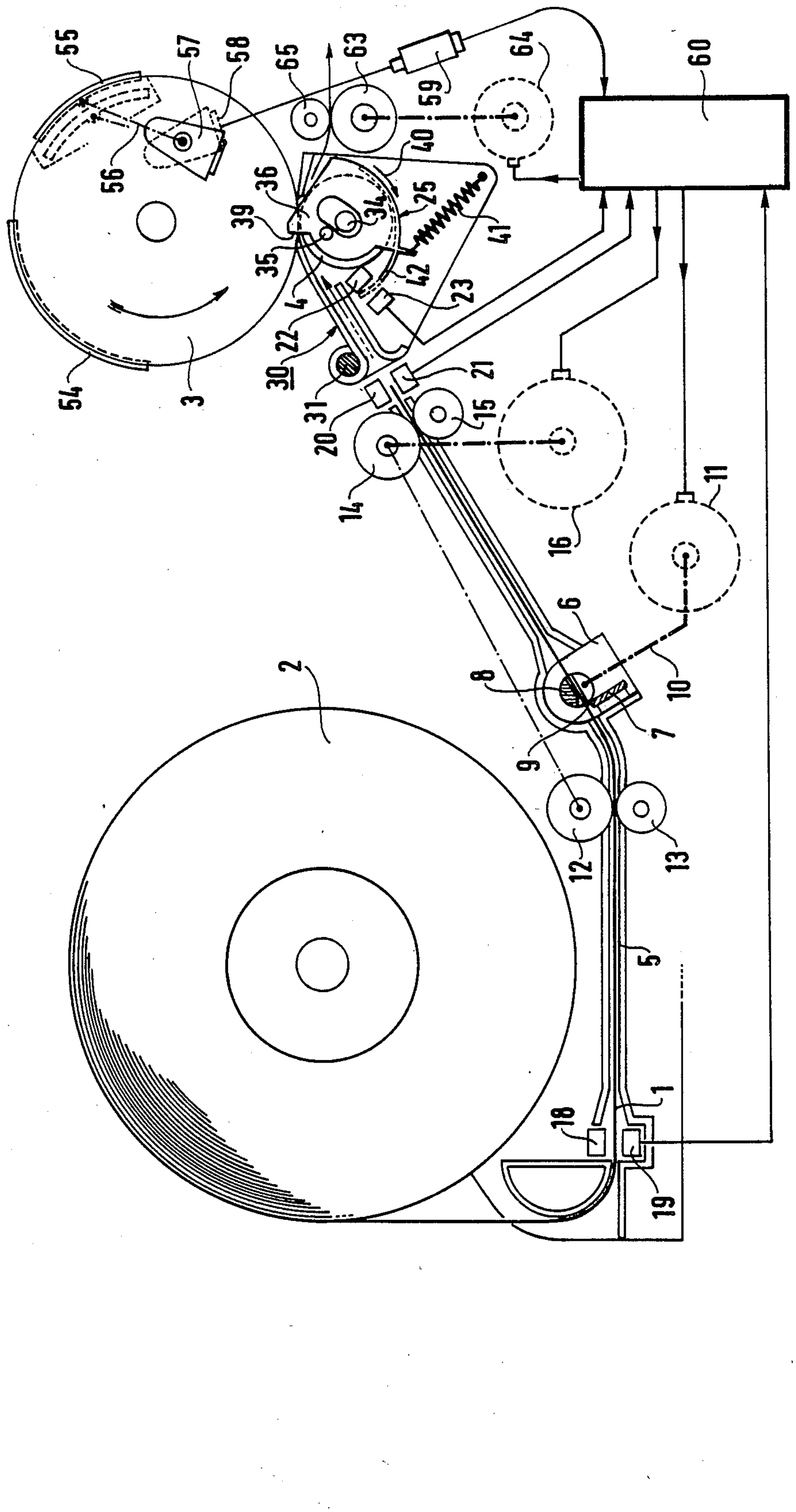
55
57
58
65
63
59
64
60
56
40
36
25
39
34
35
41
42
4
23
22
30
3
54
31
21
20
15
14
16
11
6
2
8
10
7
9
12
13
5
1
18
19

MACHINE FOR FRANKING LABELS

The present invention relates to machines for franking labels, and in particular to machines fed with continuous tape and which take one or more "short" or "long" labels from the tape and prints them on request.

In such machines, "short" labels are intended to receive franking information together with the date of franking. "Long" labels are intended to further receive one or more additional items of information referred to herein as "slogans".

The print drum prints both short labels and long labels. It is fitted with a head for printing a franking stamp together with the date, and with a retractable head or retractable plate for printing the slogan, thereby making it possible to select between printing the stamp and the date on their own or in conjunction with a slogan.

A hinged control handle at the end of the drum allows an operator to put said retractable slogan print head into its retracted position or else into its position on the periphery of the drum in order either to avoid printing the slogan, or on the contrary in order to print it. The labels received by the drum to be printed must correspondingly either be short when the slogan print head is in its retracted position, or else long when it is not retracted.

A dispenser of long or short labels taken from a continuous tape provides the print drum with a supply of labels of appropriate lengths.

As described in French patent application No. FR-A-84 06 266 filed in the name of the present Applicant, the dispenser for selectively taking short or long labels comprises intermittent tape drive means and a cutter actuated when the drive means are stationary. Two detection cells are mounted downstream from the cutter on the tape guide path in order to select between cutting off a short label or a long label. The closer of the two cells to the cutter, i.e. the upstream cell, defines the initial position of the end of the tape in the dispenser before any tape is cut. Its position relative to the cutter preferably corresponds to the length of a short label. The other cell, or downstream cell, defines the appropriate position for the end of the tape relative to the cutter to give a long label.

In operation, when a short label is desired, the tape is cut while in its initial position and then the label and the tape are driven forwards until the tape is back in its initial position. When a long label is desired, the tape is driven from its initial position up to the downstream cell, and is then cut and driven forwards again together with the cut-off label. The tape is thus returned to its initial position.

This dispenser for dispensing short and long labels is coupled to the franking machine in order to deliver the labels to the printing drum of the machine. It is advantageously controlled by a signal for detecting the angular position of the handle for moving the slogan printing head into its retracted position or its non-retracted position, in order to select whether a short label or a long label is to be taken from the tape.

Further, an extractor for extracting cut-off labels is mounted downstream from the above-mentioned cells and serves to transfer each label and to ensure that it advances beneath the drum for printing purposes.

The label must advance beneath the drum synchronously with the linear speed of the drum. To this end, the extractor includes a drive roll coupled to the drum backing roll which is also a drive roll, with the drive backing roll being driven to have the same linear speed as the drum when the drum is driven.

Each time a label is printed, the drum is driven through a complete turn in order to print the label engaged between the drum and its backing roll, and then to deliver it, after which the drum stops in a rest position waiting for a new label to be printed. A third cell serves to detect a cut-off label ready for printing arriving in the vicinity of the drum and serves to trigger a driving turn of the drum. When in its rest position, a flat on the drum, or else slack between the drum and its backing roll, ensures that the drum is not in contact with its backing roll which is driven continuously.

This way of controlling drum drive with the driving backing roll of the drum being coupled to the extractor for extracting the label to be printed makes it difficult to obtain substantially perfect synchronization between the advance speed of the label and the speed of the drum, which synchronization is required if the printing is to be totally satisfactory.

A particular object of the present invention is to avoid this synchronization drawback.

The present invention provides a franking machine for tickets which are cut off as and when required from a continuous tape in the form of long labels or short labels, as desired, the machine comprising:

- a print drum and an associated backing roll;
- a chute defining a guide path for the tape and/or the label up to the drum;
- intermittent drive means for driving the tape and a cutter for cutting off labels, said cutter being interposed on the guide path;
- first means and second means for positioning the tape respectively for cutting off a short label and for cutting off a long label, said first and second means being mounted downstream from the cutter, each at a distance therefrom which is substantially equal to the corresponding label length;
- a control circuit coupled to said first means and said second means for controlling said drive means to drive the tape through the length of the desired label; and
- a desired label length detector coupled to said control circuit for selecting said first means or said second means and for controlling the drive means depending on which of said first means and second means are selected;
- said machine being characterized in that said second means associated with positioning the tape for cutting off a long label comprise a pivoting lever mounted beneath the drum and fitted opposite the drum with a feeler which is actuated by being retracted by the end of the tape and/or a short label arriving beneath the drum, a pair of detection cells mounted offset from the print drum and the chute and coupled to said control circuit, and a shutter tab fixed to said lever and associated with said pair of cells so as to be interposed between the cells when said feeler is retracted, and otherwise to be outside said cells.

In said machine in accordance with the invention, said photo cells and said pivoting lever, together with said retractable feeler and said shutter tab thus enable the tape to be positioned in order for a long label to be takken therefrom and also allow a cut-off short or long label to be presented immediately beneath the drum which, independently of said presentation, ensures that the label advances during printing.

Other characteristics and advances of the present invention more clearly from the following description made with reference to the accompanying drawing. In the drawing, the sole FIGURE is a diagrammatic overall view of a label franking machine in accordance with the present invention.

In the label franking machine, shown diagrammatically in the FIGURE, short or long labels are cut on request from a continuous tape 1 mounted in a reel 2, and they are printed one-by-one by a print drum 3. A chute 5 guides the tape from the reel and the cut-off label by their edges up to the print drum 3 and a pressure backing roll 4 associated with the drum, and then slightly downstream from the backing roll and the drum.

A cutter 6 is interposed on the tape guide path along the chute 5. It comprises a fixed blade 7 and a rotating blade 8 defining, when driven in rotation, a tape line of cut 9 on the fixed blade. The rotary blade 8 is coupled, as represented by dot-dashed lines 10, to a cutter drive motor 11. In the rest position of the rotary blade, the cutter allows the tape to pass freely between its blades.

Two pairs of rolls 12–13 and 14–15 are interposed on the tape guide path in the chute 5 and are mounted on either side of the cutter 6 in order to drive the tape and the label cut therefrom along the chute. Each of these two pairs of rolls comprises a drive roll 12 or 14 which is partially engaged in the tape guide path and which presses against an associated pressure backing roll 13 or 15. The two drive rolls 12 and 14 are coupled to each other and to a common drive motor 16 for driving the tape and a cut-off label to be printed, as represented by the links shown in the drawing.

The presence of tape substantially at the inlet to the chute is detected by a pair of photo detection cells 18 and 19. When the tape is initially manually inserted in the chute, this pair of cells is used for starting the motor 16 and driving the pairs of rolls 12–13 and 14–15 in order to drive the tape forwardly as soon as it is presented in front of the first pair of rolls 12–13, and until it is properly positioned in the chute. This same pair of cells 18 and 19 may also act as an inhibit circuit in the franking machine for the purpose of inhibiting machine operation when there is no tape present at said pair, in particular when the tape reel is empty.

The cutter 6 is positioned on the tape guide path within the chute 5 in such a manner as to ensure that the line of cut 9 defined between its blades is at a distance from the print drum 3 and its backing roll 4 which is substantially equal to the length of long labels.

Two pairs of cells 20–21 and 22–23 are used for selecting between long labels and short labels as desired for printing by the drum, as when said said labels are cut from the tape.

The first of these pairs of cells is associated with selecting short labels and is constituted by the pairs of cells 20–21 mounted downstream from the cutter, on either side of the guide path in the chute. Its distance from the line of cut 9 between the blades of the cutter is substantially equal to the length of short labels, and it is located a little away downstream from the second pair of drive rolls 14–15. The chute 5 is interrupted at this first pair of cells with its downstream portion being independent from its upstream portion.

The second pair of cells 22–23 is associated with selecting long labels, and it is offset from the normal position which would be on the guide path of the downstream portion of the chute level with the drum 3 and its backing roll. The second pair of cells 22–23 is offset laterally relative to the backing roll 4 and is below the downstream portion of the chute and also practically below the backing roll 4. A lever 25 is associated therewith in order to enable it to perform the required detection.

Overall reference 30 designates an assembly associated with the print drum 3 and disposed beneath it, said assembly comprising the backing roll 4, the lever 25 and the associated second pair of cells 22–23 and the downstream portion of the chute for presenting labels to the print drum.

This assembly 30 is pivotally mounted on a shaft 31 which carries the inlet end of the downstream portion of the chute. The other end of said downstream portion of the chute presents labels appropriately beneath the print drum and advantageously forms an outlet guide for printed labels downstream from the print drum. In this assembly, the backing roll 4 is mounted free to rotate about its shaft 34 and is urged to press against the print durm 3. The lever 25 is pivotally mounted about a shaft 35 which is situated slightly above the shaft 34, and is offset a small distance sideways therefrom.

The lever 25 is in the form of a fork. It has two parallel plates such as the plate 36 which is the only visible plate. These two plates have very few differences (specified below) and they extend on either side of the backing roll and they are carried on the shaft 35. These plates overlap the periphery of the backing roll slightly substantially opposite to the downstream portion of the shaft where they have a profile in the form of a circular arc, and they are connected by their link part which is sketched in dashed lines and not referenced.

On each of these side plates such as 36, there is an edge shoulder level with the print drum which forms a tooth and which defines a feeler 39 which is retracted by the end of the tape and/or the label arriving thereat, i.e. arriving between the print drum 3 and the backing roll 4. The teeth or feeler 39 serve to detect the arrival of a label or of the end of the tape beneath the drum 3. When there is no tape, each of the teeth is interposed as an obstacle in the guide path, with said teeth lying substantially in the extension of the chute for guiding tape and/or labels by their edges. The teeth are retracted by the action of the label or the end of the tape causing the lever 25 to pivot about its shaft 35 as illustrated by arrow 40.

A return spring 41 urges the lever 25 to move its teeth or feeler 39 into an obstacle-forming position, in the absence of any tape or label.

In addition, the lever 25 has a tab 42 projecting along its periphery from one only of its side plates, namely the side plate 36, said tab constituting a "shutter" tab which is associated with the pair of cells 22–23. When this tab pivots with the lever to which it belongs, it extends between the two cells 22–23, thereby preventing light from reaching the detector cell whenever the feeler teeth 39 are retracted, otherwise it lies outside the cells and has no effect on them when the teeth or feeler occupy a non-retracted, obstacle-forming position. The pair of cells 22–23 and the tab 42 thus serve, in particular, to remotely detect when the tape is suitably positioned for cutting off a long label.

The two pairs of cells 20–21 and 22–23 are used, in particular, for selectively controlling the stopping of the tape drive motor so as to position the end of the tape prior to actuating the cutter with a desired length of label, as detected.

To this end, the desired length of label is preferably detected in a manner comparable to the disposition described in the Applicants' above-mentioned patent application.

A print drum 3 has thus been described having, fitted on the periphery of the drum, a head 54 for printing the stamp and the date, said head being constituted, for example, by a block of individually adjustable knurled wheels, together with a printing plate 55 for printing the slogan, which printing plate is retractable away from the periphery of the drum. Linkage symbolized by a connection 56 couples the slogan printing plate 55 to a hinged handle 57 for moving the printing plate between a non-retracted printing position shown in solid lines and a retracted position shown in dashed lines. A handle position detector 59 advantageously constituted by a photo optical emitter and receiver head is mounted at a distance from said hinged handle 57 and said handle is fitted with a mirror 58 for coupling the emit and receive portions of the detector 59 in one only of the two possible handle positions. Depending on the position of the slogan printing plate, the detector delivers the signal for selecting a short label or a long label as desired.

The print drum has two peripheral grooves (not shown in the FIGURE) receiving the teeth or feeler 39 when not retracted in the absence of a label beneath the drum. These tooth-receiving grooves are formed in the end portions of the drum on opposite sides of the head 54 and the printing plate 55.

A logic control circuit 60 is coupled to the output from the detector 59.

The logic control circuit is also coupled to the two detector cells 21 and 23 of the two pairs of cells 20–21 and 22–23. Consequently, it stops the tape drive motor 16 appropriately depending on the length of label to be taken therefrom as indicated by the detector 59. The same logic circuit 60 also controls the cutting off of a label, the advancing of a cut-off short label up to the drum by means of the motor 16, the rotating of the drum through one turn for printing a short label or a long label, and the extracting of the cut-off label. The label is extracted by a label ejection roll 63 mounted downstream from the drum and coupled to an ejection motor 64, and associated with pressure backing rolls such as 65 which press against the roll 63 in order to eject the label clamped therebetween substantially by its side edges. To control these operations, the logic circuit 60 is coupled to the motor 16, 11, and 64, and also to the drum drive motor (not shown). It also receives the output signal from the detector cell 19 of the pair of cells 18–19 for detecting tape in the initial loading position and for inhibiting the machine when there is no tape. These various control operations can be understood from the operation of the machine as described below.

When tape is loaded into the machine, the end of the tape is manually inserted and pushed into the chute 5. When it passes between the inlet pair of cells 18–19, the logic control circuit 60 switches on the motor 16 in order to drive the tape as soon as its end reaches the first pair of rolls 12–13, and until its end comes between the pair of cells 20–21. At this moment, and depending on the position of the hinged handle 57 as detected by the optical head 59, the pair of cells 20–21 cause the motor 16 to stop if said handle is in the short label position, or else if the handle is in the long label position, the logic circuit inhibits the pair of cells 20–21 and the tape continues to advance under the action of the pairs of rolls 12–13 and 14–15 until its end abuts against the teeth or feeler 39 of the pivoting lever 25. At this moment, the tape causes the lever to pivot by retracting the teeth or feeler 39, and the tab 42 is simultaneously interposed between the cells of the pair 22–23, thereby stopping the motor 16.

After the end of the tape has been suitably positioned, depending on the position of the handle 57, the cutter actuator motor 11 is switched on by a signal from the same detector cell of the pair 20–21 or 22–23 which cause the motor 16 to stop.

If a short label is being cut from the tape, the motor 16 is switched on again to drive the tape and the short label up to the teeth or feeler 39 of the lever 25 whose tab 42 is then interposed between the pair of cells 22 and 23, thereby stopping the motor 16.

At this moment, the end of a short label or a long label is located in a position where it is just engaged beneath the print drum 3 against the non-driving backing roll 4. The logic circuit 60 then switches on the mechanism for driving the drum through one complete turn. During this rotation, the label is printed and it advances towards the ejection roll 63. A time delay triggered by the driving of the drum 3 enables the logic circuit to start the motor 64 coupled to the ejection roll 63 for the purpose of delivering the printed label, and also to start the motor 16 for driving the tape so as to position the end of the tape in the desired position as indicated by the detected position of the handle 57.

The motor 16 is advantageously a reversible motor.

Thus, with respect to the above-explained operation, if the handle 57 is in the long label position, for which the end of the tape was positioned at the feeler, and if the operator then puts the handle in a newly desired short label position, the logic circuit receives the transition in the signal from the detector 59 which corresponds to this change in the desired length of label. In this case, the logic circuit 60 switches on the motor 16 in order to reverse the end of the tape until it reaches the pair of cells 20–21, with the corresponding length of tape being taken up on the reel 2 which is mounted to keep the tape taut, thereby properly positioning the end of the tape prior to cutting off a short label.

In similar manner, if the handle 57 is moved from its short label position to its long label position, the opposite transition in the signal from the detector 59 causes the logic circuit 60 to switch on the motor 16 to advance the tape until it reaches the feeler prior to cutting off the desired long label.

In a variant of this operation, when the motor 16 is capable only of advancing the tape, the tape may be moved to the initial position determined by the pair of cells 20–21 only, regardless of the length of label specified by the position of the handle. In this case, if the desired length of label is short, then the label is cut off and then the label and the tape are advanced until the labe engages the teeth or feeler of the lever 25, after which printing takes place and the label is advanced and the printed label is ejected while the tape is simultaneously advanced to its initial position. However, if the desired label length is long, then the tape is advanced from its initial position up to the feeler of the lever 25, after which the label is cut off, and printed, and the long printed label is then advanced and ejected while the tape is simultaneously advanced to its initial position.

The present invention has the advantage of avoiding any problem relating to synchronizing the arrival of the label beneath the print drum, by positioning both short labels and long labels so that they are properly engaged between the print drum and its free-wheeling backing roll, with the labels then being stopped in this position, after which they are advanced and printed directly by the drum.

The present invention has been described with reference to an embodiment illustrated in the accompanying drawing. Naturally this embodiment has been given merely by way of example and changes in detail may be applied thereto and/or various means may be replaced by equivalent means without going beyond the scope of the invention.

I claim:

1. A franking machine for tickets which are cut off as and when required from a continuous tape in the form of long labels or short labels, as desired, the machine comprising:
- a print drum and an associated backing roll;
- a chute defining a guide path for the tape and/or the label up to the drum;
- intermittent drive means for driving the tape and a cutter for cutting off labels, said cutter being interposed on the guide path;
- first means and second means for positioning the tape respectively for cutting off a short label and for cutting off a long label, said first and second means being mounted downstream from the cutter, each at a distance therefrom which is substantially equal to the corresponding label length;
- a control circuit coupled to said first means and said second means for controlling said drive means to drive the tape through the length of the desired label; and
- a desired label length detector coupled to said control circuit for selecting said first means or said second means and for controlling the drive means depending on which of said first means and second means are selected;
- said machine being characterized in that said second means associated with positioning the tape for cutting off a long label comprise a pivoting lever mounted beneath the drum and fitted opposite the drum with a feeler positioned in the path of and retracted by the end of the tape and/or short label arriving beneath the drum, a pair of detection cells mounted offset from the print drum and the chute and coupled to said control circuit, and a shutter tab fixed to said lever and movable between said pair of cells so as to be interposed between the cells when said feeler is retracted, and effecting through said control circuit control the rotational drive of the print drum over a single turn thereby advancing each long and short label into position beneath said drum for synchronize printing thereon and otherwise to be outside said cells.

2. A label franking machine according to claim 1, characterized in that said backing roll associated with the print drum is a pressure backing roll mounted free to rotate about its axis of rotation (34).

3. A label franking machine according to claim 2, characterized in that the said lever (25) constitutes a plate (36) disposed laterally beneath at least one of the ends of the backing roll (4) and has a tooth (39) projecting from the periphery of said backing roll opposite the drum and constituting said feeler, said lever being resiliently urged (41) to ensure that said feeler is not retracted in the absence of contact between said feeler and the tape or the label.

4. A machine for franking labels according to claim 3, characterized in that said backing roll (4), said lever (25), said pair of cells (22-23), and the end portion of the chute (5) downstream from said first means (20, 21) for determining tape positioning when cutting off short labels are all mounted in an assembly (30) beneath said print drum (3).

5. A machine for franking labels according to claim 4, characterized in that said assembly (30) is pivotally mounted about an axis (31) substantially at the end of the downstream portion of said chute opposite to said drum.

6. A machine for franking labels according to claim 1, characterized in that said detector of the desired length of ticket is constituted by a photoelectric head (53) whose emitting portion and receiving portion are coupled by a mirror (58) carried by a lever (57) for actuating a retractable slogan printing plate (55) carried by the drum, for one of the positions of said handle.

7. A machine for franking job labels according to claim 1, characterized in that said drive means (12,13,14,15,16) include a reversible motor (16) controlled by said control circuit (60) in one direction or the other whenever the desired length of label is changed, depending on whether the chnage is from a short label to a long label or from a long label to a short label.

* * * * *